United States Patent
Thorson et al.

(10) Patent No.: US 10,074,051 B2
(45) Date of Patent: Sep. 11, 2018

(54) VECTOR COMPUTATION UNIT IN A NEURAL NETWORK PROCESSOR

(71) Applicant: Google LLC, Mountain View, CA (US)

(72) Inventors: Gregory Michael Thorson, Waunakee, WI (US); Christopher Aaron Clark, Madison, WI (US); Dan Luu, Madison, WI (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/389,288

(22) Filed: Dec. 22, 2016

(65) Prior Publication Data

US 2017/0103315 A1    Apr. 13, 2017

Related U.S. Application Data

(63) Continuation of application No. 14/845,117, filed on Sep. 3, 2015.

(60) Provisional application No. 62/165,022, filed on May 21, 2015.

(51) Int. Cl.
| | |
|---|---|
| *G06N 3/063* | (2006.01) |
| *G06N 3/08* | (2006.01) |
| *G06N 5/04* | (2006.01) |

(52) U.S. Cl.
CPC ............. *G06N 3/08* (2013.01); *G06N 3/063* (2013.01); *G06N 5/04* (2013.01)

(58) Field of Classification Search
CPC ....................................................... G06N 3/063
USPC ............................................................ 706/33
See application file for complete search history.

(56) References Cited

U.S. PATENT DOCUMENTS

| | | | |
|---|---|---|---|
| 3,761,876 | A | 9/1973 | Flaherty |
| 3,777,132 | A | 12/1973 | Bennett, Jr. |
| 4,839,836 | A | 6/1989 | Fonsalas |
| 5,014,235 | A | 5/1991 | Morton |
| 5,136,717 | A | 8/1992 | Morley et al. |
| 5,138,695 | A | 8/1992 | Means |
| 5,146,543 | A | 9/1992 | Vassiliadis et al. |
| 5,337,395 | A | 8/1994 | Vassiliadis et al. |
| 5,471,627 | A | 11/1995 | Means et al. |
| 5,519,811 | A | 5/1996 | Yoneda |
| 5,544,336 | A | 8/1996 | Kato |
| 5,799,134 | A | 8/1998 | Chiueh et al. |

(Continued)

FOREIGN PATENT DOCUMENTS

| | | |
|---|---|---|
| CN | 104035751 | 9/2014 |
| EP | 0422348 | 4/1991 |

(Continued)

OTHER PUBLICATIONS

Yiping et al ("A High Performance Digital Neural Processor Design by Network on Chip Architecture" IEEE 2011).*

(Continued)

*Primary Examiner* — Lut Wong
(74) *Attorney, Agent, or Firm* — Fish & Richardson P.C.

(57) ABSTRACT

A circuit for performing neural network computations for a neural network comprising a plurality of layers, the circuit comprising: activation circuitry configured to receive a vector of accumulated values and configured to apply a function to each accumulated value to generate a vector of activation values; and normalization circuitry coupled to the activation circuitry and configured to generate a respective normalized value from each activation value.

16 Claims, 9 Drawing Sheets

(56) References Cited

U.S. PATENT DOCUMENTS

| | | | |
|---|---|---|---|
| 5,812,993 | A | 9/1998 | Ginosar et al. |
| 6,038,337 | A | 3/2000 | Lawrence |
| 6,184,753 | B1 | 2/2001 | Ishimi |
| 7,136,710 | B1 | 11/2006 | Hoffberg |
| 8,184,696 | B1 | 5/2012 | Chirila-Rus |
| 8,468,109 | B2 | 6/2013 | Moussa et al. |
| 8,924,455 | B1 | 12/2014 | Barman et al. |
| 2005/0044053 | A1 | 2/2005 | Moreno |
| 2007/0022063 | A1 | 1/2007 | Lightowler |
| 2007/0086655 | A1 | 4/2007 | Simard et al. |
| 2008/0319933 | A1 | 12/2008 | Moussa |
| 2010/0312735 | A1* | 12/2010 | Knoblauch .............. G06N 3/08 706/25 |
| 2011/0029471 | A1 | 2/2011 | Chakradhar et al. |
| 2014/0142929 | A1 | 5/2014 | Seide et al. |
| 2014/0180989 | A1 | 6/2014 | Krizhevsky et al. |
| 2014/0288928 | A1 | 9/2014 | Penn et al. |
| 2014/0337262 | A1 | 11/2014 | Kato et al. |
| 2016/0267111 | A1 | 9/2016 | Shoaib |

FOREIGN PATENT DOCUMENTS

| | | |
|---|---|---|
| EP | 3064130 | 9/2016 |
| TW | 200627103 A | 8/2006 |
| TW | 201232429 | 8/2012 |
| TW | 201331855 | 8/2013 |

OTHER PUBLICATIONS

Merolla et al ("A Digital Neurosynaptic Core Using Embedded Crossbar Memory with 45pJ per Spike in 45nm" IEEE 2014).*
Kim et al ("Efficient Hardware Architecture for Sparse Coding" IEEE 2014).*
Beamer et al., "Ivy Bridge Server Graph Processing Bottlenecks," The First International Workshop Computer Architecture for Machine Learning, Jun. 2015, 56 pages.
Bo et al., "String Kernel Testing Acceleration Using Micron's Automata Processor," The First International Workshop Computer Architecture for Machine Learning, Jun. 2015, 21 pages.
Chen and Li, "Hardware Acceleration for Neuromorphic Computing—An Evolving View," The First International Workshop Computer Architecture for Machine Learning, Jun. 2015, 38 pages.
Chillet et al., "A Neural Network Model for Real-Time Scheduling on Heterogeneous SoC Architectures," Proceedings of International Joint Conference on Neural Networks, Aug. 2007, pp. 102-107.
Cornu et al., "Design, Implementation, and Test of a Multi-Model Systolic Neural-Network Accelerator," Scientific Programming—Parallel Computing Projects of the Swiss Priority Programme, vol. 5, No. 1, Jan. 1, 1996, pp. 47-61, XP055294242.
Dawwd, "The multi 2D systolic design and implementation of Convolutional Neural Networks," 2013 IEEE 20$^{th}$ International Conference on Electronics, Circuits, and Systems (ICECS), IEEE, Dec. 8, 2013, pp. 221-224, XP032595248.
Farabet et al., "Hardware Accelerated Convolutional Neural Networks for Synthetic Vision Systems," Circuits and Systems (ISCAS), Proceedings of 2010 IEEE International Symposium on, May-Jun. 2010, pp. 257-260.
Ginosar, "Accelerators for Machine Learning of Big Data," The First International Workshop Computer Architecture for Machine Learning, Jun. 2015, 13 pages.
Gokhale, "Enabling Machines to Understand our World," The First International Workshop Computer Architecture for Machine Learning, Jun. 2015, 18 pages.
Graf et al., "A Massively Parallel Digital Learning Processor," Proceedings of the 22$^{nd}$ annual conference on Neural Information Processing Systems (NIPS), Dec. 2008, 8 pages, XP055016863.
Hecht et al., "An advanced programmable 2D-convolution chip for, real time image processing," Signal Image and Video Processing, Jun. 1991; [Proceedings of the International Symposium on Circuits and Systems], vol. SYMP. 24, Jun. 11, 1991, pp. 1897-1900, XP010046404.

Indiveri, "Neuromorphic circuits for building autonomous cognitive systems," The First International Workshop Computer Architecture for Machine Learning, Jun. 2015, 37 pages.
International Search Report and Written Opinion in International Application No. PCT/US2016/030515, dated Aug. 25, 2016, 19 pages.
International Search Report and Written Opinion in International Application No. PCT/US2016/030536, dated Aug. 31, 2016, 17 pages.
International Search Report and Written Opinion in International Application No. PCT/US2016/029968, dated Sep. 1, 2016, 14 pages.
International Search Report and Written Opinion in International Application No. PCT/US2016/029294, dated Sep. 1, 2016, 13 pages.
International Search Report and Written Opinion in International Application No. PCT/US2016/029986, dated Sep. 1, 2016, 13 pages.
International Search Report and Written Opinion in International Application No. PCT/US2016/029965, dated Sep. 1, 2016, 13 pages.
Kane, "An instruction systolic array architecture for multiple neural network types," Loughborough University, Doctoral Thesis, Sep. 1998, 315 pages.
Khan and Ling, "Systolic architectures for artificial neural nets," Neural Networks, 1991. 1991 IEEE International Joint Conference on, vol. 1, Nov. 1991, pp. 620-627.
Kim et al., "A Large-Scale Architecture for Restricted Boltzmann Machines," Field-Programmable Custom Computing Machines (FCCM), 2010 18th IEEE Annual International Symposium on, IEEE, May 2, 2010, pp. 201-208, XP031681940.
Krizhevsky et al., "ImageNet classification with deep convolutional neural networks," The 26th annual conference on Neural Information Processing Systems (NIPS'25), Dec. 2012, pp. 1-9, XP55113686.
Kung et al., "Two-level pipelined systolic array for multidimensional convolution," Image and Vision Computing, Elsevier, vol. 1, No. 1, Feb. 2, 1983, pp. 30-36, XP024237511.
Kung, "VLSI Array Processors," IEEE ASSP Magazine, IEEE, vol. 2, No. 3, Jul. 1, 1985, pp. 4-22, XP011370547.
Lee and Song, "Implementation of the Super-Systolic Array for Convolution," Design Automation Conference, 2003. Proceedings of the ASP-DAC 2003. Asia and South Pacific, Jan. 2003, pp. 491-494.
Lehmann et al., "A generic systolic array building block for neural networks with on-chip learning," Neural Networks, IEEE Transactions on, 4(3):400-407, May 1993.
Lipasti et al., Mimicking the Self-Organizing Properties of the Visual Cortex, The First International Workshop Computer Architecture for Machine Learning, Jun. 2015, 23 pages.
Mahapatra et al., "Mapping of Neural Network Models onto Systolic Arrays," Journal of Parallel and Distributed Computing 60, 677-689, Jan. 2000.
Ovtcharov et al., "Accelerating Deep Convolutional Neural Networks Using Specialized Hardware in the Datacenter," The First International Workshop Computer Architecture for Machine Learning, Jun. 2015, 33 pages.
Patil et al., "Hardware Architecture for Large Parallel Array of Random Feature Extractors applied to Image Recognition," Dec. 24, 2015, arXiv:1512.07783v1, 18 pages, XP055296121.
Pearce, "You Have No (Predictive) Power Here, SPEC!" The First International Workshop Computer Architecture for Machine Learning, Jun. 2015, 15 pages.
Rojas, "Hardware for Neural Networks," Neural Networks, Springer-Verlag, Berlin, 1996, pp. 451-478.
Shaaban, "Systolic Architectures," PowerPoint Presentation, Mar. 2003, 9 pages.
Shapri and Rahman, "Performance Analysis of Two-Dimensional Systolic Array Matrix Multiplication with Orthogonal Interconnections," International Journal on New Computer Architectures and Their Applications (IJNCAA) 1(3):1066-1075, Dec. 2011.
Smith, "Biologically Plausible Spiking Neural Networks," The First International Workshop Computer Architecture for Machine Learning, Jun. 2015, 77 pages.

(56) References Cited

OTHER PUBLICATIONS

Sudha et al., "Systolic array realization of a neural network-based face recognition system," Industrial Electronics and Applications, 2008, ICIEA 2008, 3rd IEEE Conference on, pp. 1864-1869, Jun. 2009.
Wong et al., "A New Scalable Systolic Array Processor Architecture for Discrete Convolution," College of Engineering at the University of Kentucky, Master Thesis, 2003, 175 pages.
Wu et al., "Flip-Rotate-Pooling Convolution and Split Dropout on Convolution Neural Networks for Image Classification," Jul. 31, 2015, arXiv:1507.08754v1, pp. 1-9, XP055296122.
Office Action in Taiwanese Application No. 105115859, dated Nov. 16, 2016, 10 pages.
Ahm Shapri and N.A.Z Rahman. "Performance Analysis of Two-Dimensional Systolic Array Matrix Multiplication with Orthogonal Interconnections," Internafiona lJournal on New Computer Architectures and Their Applications, 1(3), 2001, pp. 1090-1000.
Dielman, Sander, Kyle W. Willett, and Joni Dambre. "Rotation-invariant convolutional neural networks for galaxy morphology prediction," Monthly notices of the royal astronomical society, 450.2, 2015, pp. 1441-1459.
Lee, Yim-Kul, and William T. Rhodes. "Nonlinear image processing by a rotating kernel transformation," Optics letters 15.23, 1990, pp. 1383-1385.
Lo, Shih-Chung B., et al. "Artificial convolutional neural network for medical image pattern recognition," Neural networks 8.7, 1995, pp. 1201-1214.
Carlo et al., "An Area-Efficient 2-D Convolution Implementation on FPGA for Space Applications," IEEE Computer Society, Dec. 11, 2011, pp. 1-7.
International Preliminary Report on Patentability issued in International Application No. PCT/US2016/029986, dated Nov. 30, 2017, 7 pages.

\* cited by examiner

VECTOR COMPUTATION UNIT IN A NEURAL NETWORK PROCESSOR

CROSS REFERENCE TO RELATED APPLICATIONS

This application is a continuation of U.S. application Ser. No. 14/845,117, filed on Sep. 3, 2015, which is a nonprovisional of and claims priority to U.S. Provisional Patent Application No. 62/165,022, filed on May 21, 2015, the entire contents of which are hereby incorporated by reference.

BACKGROUND

This specification relates to computing neural network inferences in hardware.

Neural networks are machine learning models that employ one or more layers to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

SUMMARY

In general, this specification describes a special-purpose hardware circuit that computes neural network inferences.

In general, one innovative aspect of the subject matter described in this specification can be embodied in a circuit for performing neural network computations for a neural network comprising a plurality of layers, the circuit comprising: activation circuitry configured to receive a vector of accumulated values and configured to apply a function to each accumulated value to generate a vector of activation values; and normalization circuitry coupled to the activation circuitry and configured to generate a respective normalized value for each activation value.

Implementations can include one or more of the following features. The activation circuitry receives the vector of accumulated values from a systolic array in the circuit. The normalization circuitry comprises a plurality of normalization register columns, each normalization register column comprising a plurality of normalization registers connected in series, each normalization register column configured to receive a distinct activation value, a respective normalization unit in the normalization register column configured to calculate a respective normalized value. Each normalization unit is configured to pass the distinct activation value to an adjacent normalization unit. Each normalization unit is configured to: receive a respective activation value; generate a respective intermediate normalized value from the respective activation value; and send the respective intermediate normalized value to one or more neighboring normalization units. Generating the respective intermediate normalized value comprises generating a square of the respective activation value. Each normalization unit is further configured to: receive, from one or more neighboring normalization units, one or more intermediate normalized values generated from activation values; sum each intermediate normalized value to generate an index; use the index to access one or more values from a lookup table; generate a scaling factor from the one or more values and the index; and generate the respective normalized value from the scaling factor and the respective activation value. Pooling circuitry configured to receive the normalized values and configured to pool the normalized values to generate a pooled value. The pooling circuitry is configured to store the plurality of normalized values in a plurality of registers and a plurality of memory units, where the plurality of registers and the plurality of memory units are connected in series, where each register stores one normalized value and each memory unit stores a plurality of normalized values, where the pooling circuitry is configured to, after every clock cycle, shift a given normalized value to a subsequent register or memory unit, and where the pooling circuitry is configured to generate the pooled value from the normalized values. Pooling circuitry configured to receive the activation values and configured to pool the activation values to generate a pooled value. The pooling circuitry is configured to store the plurality of activation values in a plurality of registers and a plurality of memory units, where the plurality of registers and the plurality of memory units are connected in series, where each register stores one normalized value and each memory unit stores a plurality of activation values, where the pooling circuitry is configured to, after every clock cycle, shift a given activation value to a subsequent register or memory unit, and where the pooling circuitry is configured to generate the pooled value from the activation values.

Particular embodiments of the subject matter described in this specification can be implemented so as to realize one or more of the following advantages. Multiple activation values for each neural network layer of a neural network can be computed during a given clock cycle. Optionally, the processor can generate multiple normalized values from the activation values during another given clock cycle. The processor can also optionally generate pooled values from the normalized values or the activation values. The processor is capable of taking a new accumulated sum in each clock cycle and producing an activated, normalized, and pooled result in each clock cycle, thereby pipelining computations.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

A neural network having multiple layers can be used to compute inferences. For example, given an input, the neural network can compute an inference for the input. The neural network computes this inference by processing the input through each of the layers of the neural network. In particular, the layers of the neural network are arranged in a sequence, each with a respective set of weights. Each layer receives an input and processes the input in accordance with the set of weights for the layer to generate an output.

Therefore, in order to compute an inference from a received input, the neural network receives the input and processes it through each of the neural network layers in the sequence to generate the inference, with the output from one neural network layer being provided as input to the next neural network layer. Data inputs to a neural network layer, e.g., either the input to the neural network or the outputs of the layer below the layer in the sequence, to a neural network layer can be referred to as activation inputs to the layer.

In some implementations, the layers of the neural network are arranged in a directed graph. That is, any particular layer can receive multiple inputs, multiple outputs, or both. The layers of the neural network can also be arranged such that an output of a layer can be sent back as an input to a previous layer.

Some neural networks normalize outputs from one or more neural network layers to generate normalized values that are used as inputs to subsequent neural network layers. Normalizing the outputs can help ensure the normalized values remain within expected domains for the inputs of the subsequent neural network layers. This can reduce errors in inference calculations.

Some neural networks pool outputs from one or more neural network layers to generate pooled values that are used as inputs to subsequent neural network layers. In some implementations, the neural network pools a group of outputs by determining a maximum or average of the group of outputs and using the maximum or average as the pooled output for the group. Pooling the outputs can maintain some spatial invariance so the outputs arranged in various configurations can be processed to have the same inference. Pooling the outputs can also reduce dimensionality of inputs received at the subsequent neural network layers while maintaining desired characteristics of the outputs before pooling, which can improve efficiency without significantly compromising the quality of inferences generated by the neural networks.

This specification describes special-purpose hardware circuitry that optionally performs normalization, pooling, or both on outputs of one or more neural network layers.

Figure 1:
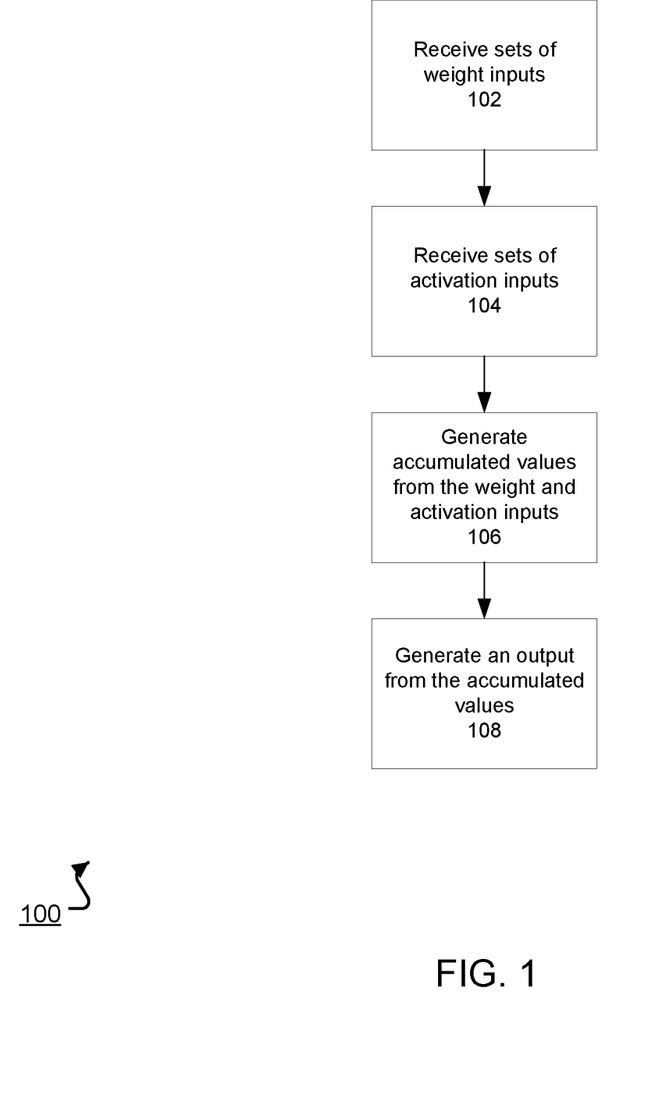
FIG. 1 is a flow diagram of an example method for performing a computation for a given layer of a neural network.

FIG. 1 is a flow diagram of an example process 100 for performing a computation for a given layer of a neural network using a special-purpose hardware circuit. For convenience, the method 100 will be described with respect to a system having one or more circuits that performs the method 100. The method 100 can be performed for each layer of the neural network in order to compute an inference from a received input.

The system receives sets of weight inputs (step 102) and sets of activation inputs (step 104) for the given layer. The sets of weight inputs and the sets of activation inputs can be received from dynamic memory and a unified buffer, respectively, of the special-purpose hardware circuit. In some implementations, both the sets of weight inputs and the sets of activation inputs can be received from the unified buffer.

The system generates accumulated values from the weight inputs and the activation inputs using a matrix multiplication unit of the special-purpose hardware circuit (step 106). In some implementations, the accumulated values are dot products of the sets of weight inputs and the sets of activation inputs. That is, for one set of weights, which is a subset of all weights in the layer, the system can multiply each weight input with each activation input and sum the products together to form an accumulated value. The system can then compute dot products of other set of weights with other sets of activation inputs.

The system can generate a layer output from the accumulation values (step 108) using a vector computation unit of the special-purpose hardware circuit. In some implementations, the vector computation unit applies an activation function to the accumulated values, which will be described further below in reference to FIG. 5. The output of the layer can be stored in the unified buffer for use as an input to a subsequent layer in the neural network or can be used to determine the inference. The system finishes processing the neural network when a received input has been processed through each layer of the neural network to generate the inference for the received input.

Figure 2:
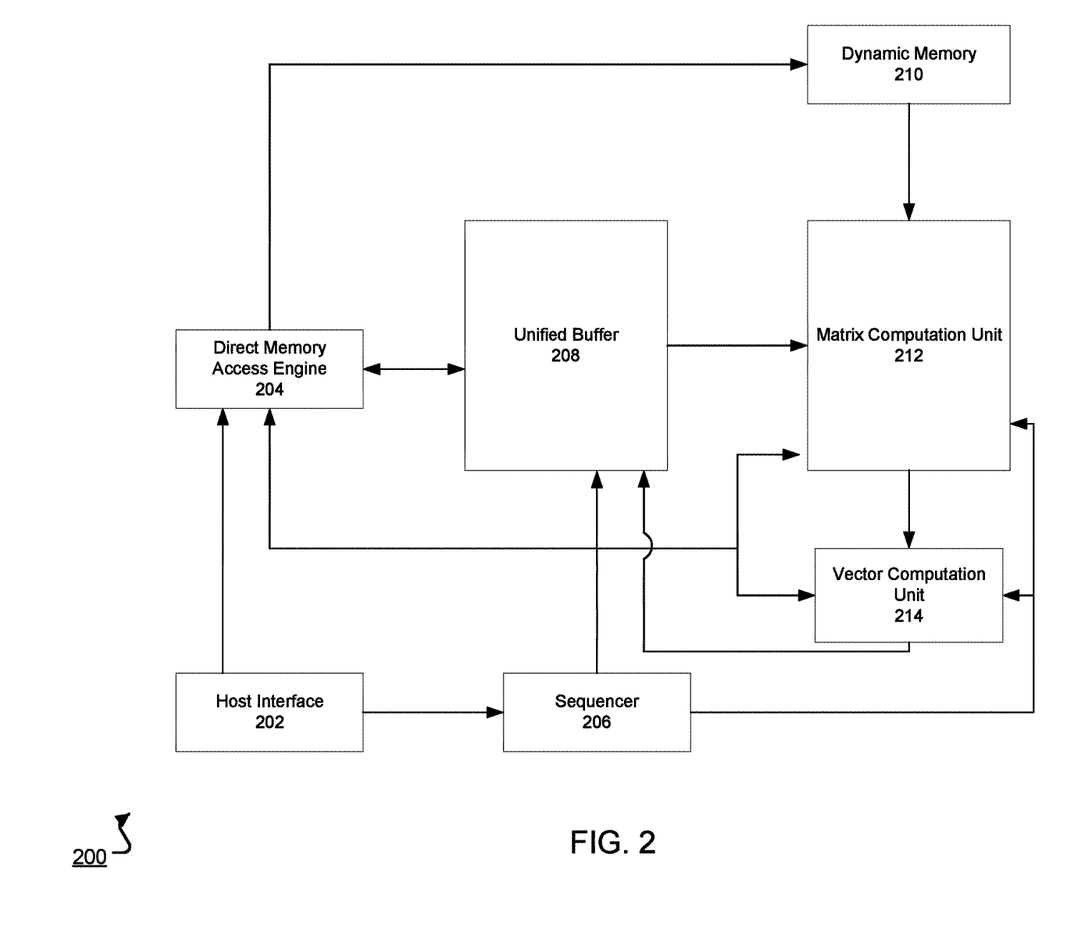
FIG. 2 shows an example neural network processing system.

FIG. 2 shows an example special-purpose integrated circuit 200 for performing neural network computations. The system 200 includes a host interface 202. The host interface 202 can receive instructions that include parameters for a neural network computation. The parameters can include one or more of the following: how many layers should be processed, corresponding sets of weight inputs for each layer of the model, an initial set of activation inputs, i.e., the input to the neural network from which the inference is to be computed, corresponding input and output sizes of each layer, a stride value for the neural network computation, and a type of layer to be processed, e.g., a convolutional layer or a fully connected layer.

The host interface 202 can send the instructions to a sequencer 206, which converts the instructions into low level control signals that control the circuit to perform the neural network computations. In some implementations, the control signals regulate dataflow in the circuit, e.g., how the sets of weight inputs and the sets of activation inputs flow through the circuit. The sequencer 206 can send the control signals to a unified buffer 208, a matrix computation unit 212, and a vector computation unit 214. In some implementations, the sequencer 206 also sends control signals to a direct memory access engine 204 and dynamic memory 210. In some implementations, the sequencer 206 is a processor that generates control signals. The sequencer 206 can use timing of the control signals to, at appropriate times, send the control signals to each component of the circuit 200. In some other implementations, the host interface 202 passes in a control signal from an external processor.

The host interface 202 can send the sets of weight inputs and the initial set of activation inputs to the direct memory access engine 204. The direct memory access engine 204 can store the sets of activation inputs at the unified buffer 208. In some implementations, the direct memory access stores the sets of weights to dynamic memory 210, which can be a memory unit. In some implementations, the dynamic memory is located off of the circuit.

The unified buffer 208 is a memory buffer. It can be used to store the set of activation inputs from the direct memory access engine 204 and outputs of the vector computation unit 214. The vector computation unit will be described in more detail below with reference to FIG. 5. The direct memory access engine 204 can also read the outputs of the vector computation unit 214 from the unified buffer 208.

The dynamic memory 210 and the unified buffer 208 can send the sets of weight inputs and the sets of activation inputs, respectively, to the matrix computation unit 212. In some implementations, the matrix computation unit 212 is a two-dimensional systolic array. The matrix computation unit 212 can also be a one-dimensional systolic array or other circuitry that can perform mathematical operations, e.g., multiplication and addition. In some implementations, the matrix computation unit 212 is a general purpose matrix processor.

The matrix computation unit 212 can process the weight inputs and the activation inputs and provide a vector of outputs to the vector computation unit 214. In some implementations, the matrix computation unit sends the vector of outputs to the unified buffer 208, which sends the vector of outputs to the vector computation unit 214. The vector computation unit can process the vector of outputs and store a vector of processed outputs to the unified buffer 208. The vector of processed outputs can be used as activation inputs to the matrix computation unit 212, e.g., for use in a subsequent layer in the neural network. The matrix computation unit 212 and the vector computation unit 214 will be described in more detail below with reference to FIG. 3 and FIG. 5, respectively.

Figure 3:
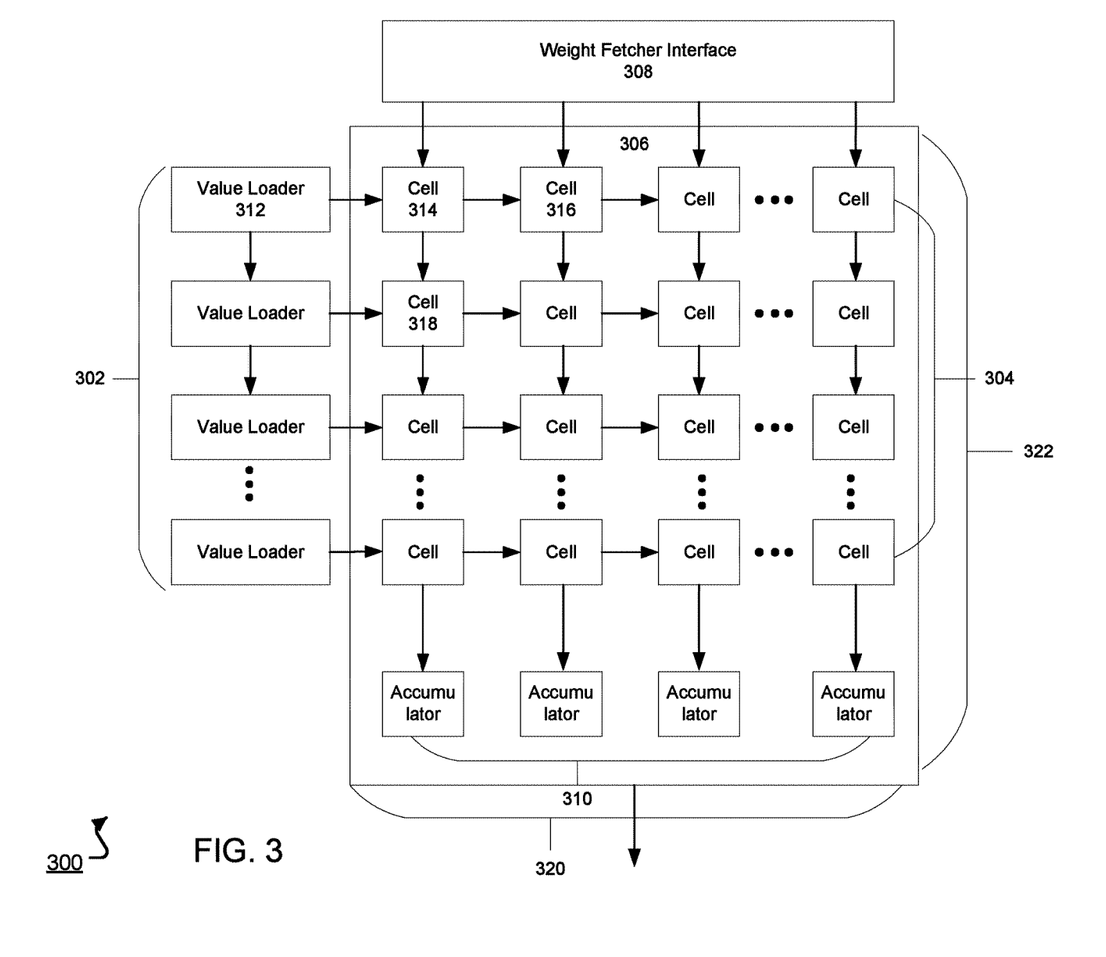
FIG. 3 shows an example architecture including a matrix computation unit.

FIG. 3 shows an example architecture 300 including a matrix computation unit. The matrix computation unit is a two-dimensional systolic array 306. The array 306 includes multiple cells 304. In some implementations, a first dimension 320 of the systolic array 306 corresponds to columns of cells and a second dimension 322 of the systolic array 306 corresponds to rows of cells. The systolic array can have more rows than columns, more columns than rows, or an equal number of columns and rows.

In the illustrated example, value loaders 302 send activation inputs to rows of the array 306 and a weight fetcher interface 308 sends weight inputs to columns of the array 306. In some other implementations, however, activation inputs are transferred to the columns and weight inputs are transferred to the rows of the array 306.

The value loaders 302 can receive the activation inputs from a unified buffer, e.g., the unified buffer 208 of FIG. 2. Each value loader can send a corresponding activation input to a distinct left-most cell of the array 306. For example, value loader 312 can send an activation input to cell 314. The value loader can also send the activation input to an adjacent value loader, and the activation input can be used at another left-most cell of the array 306. This allows activation inputs to be shifted for use in another particular cell of the array 306.

The weight fetcher interface 308 can receive the weight input from a memory unit, e.g., the dynamic memory 210 of FIG. 2. The weight fetcher interface 308 can send a corresponding weight input to a distinct top-most cell of the array 306. For example, the weight fetcher interface 308 can send weight inputs to cells 314 and 316.

In some implementations, a host interface, e.g., the host interface 202 of FIG. 2, shifts activation inputs throughout the array 306 along one dimension, e.g., to the right, while shifting weight inputs throughout the array 306 along another dimension, e.g., to the bottom. For example, over one clock cycle, the activation input at cell 314 can shift to an activation register in cell 316, which is to the right of cell 314. Similarly, the weight input at cell 316 can shift to a weight register at cell 318, which is below cell 314.

On each clock cycle, each cell can process a given weight input, a given activation input, and an accumulated output from an adjacent cell to generate an accumulated output. The accumulated output can also be passed to the adjacent cell along the same dimension as the given weight input. An individual cell is described further below with reference FIG. 4.

The accumulated output can be passed along the same column as the weight input, e.g., towards the bottom of the column in the array 306. In some implementations, at the bottom of each column, the array 306 can include accumulator units 310 that store and accumulate each accumulated output from each column when performing calculations with layers having more activation inputs than rows. In some implementations, each accumulator unit stores multiple parallel accumulations. This will be described further below with reference to FIG. 6. The accumulator units 310 can accumulate each accumulated output to generate a final accumulated value. The final accumulated value can be transferred to a vector computation unit, e.g., the vector computation unit 502 of FIG. 5. In some other implementations, the accumulator units 310 passes the accumulated values to the vector computation unit without performing any accumulations when processing layers with layers having fewer activating inputs than rows.

Figure 4:
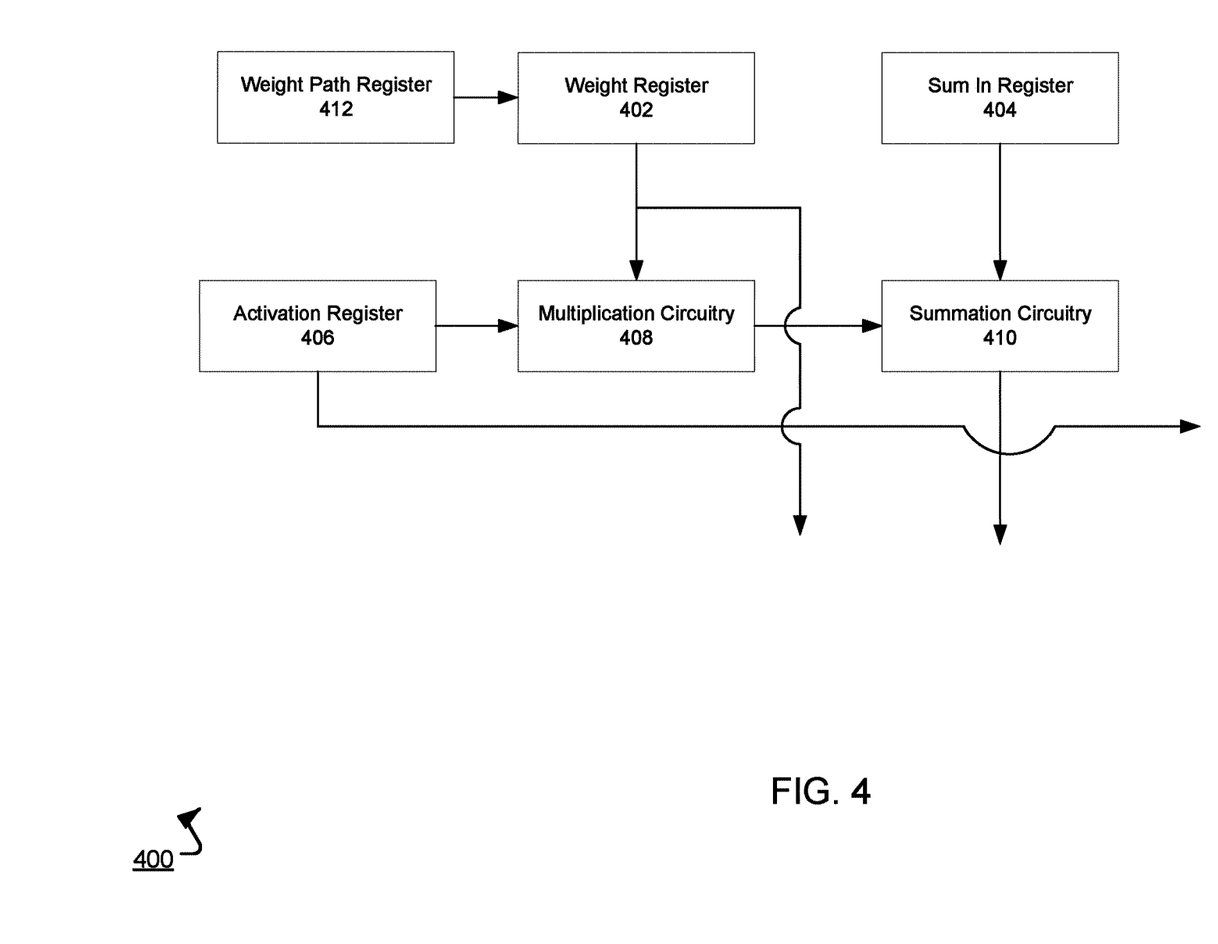
FIG. 4 shows an example architecture of a cell inside a systolic array.

FIG. 4 shows an example architecture 400 of a cell inside a systolic array, e.g., the systolic array 306 of FIG. 3.

The cell can include an activation register 406 that stores an activation input. The activation register can receive the activation input from a left adjacent cell, i.e., an adjacent cell located to the left of the given cell, or from a unified buffer, depending on the position of the cell within the systolic array. The cell can include a weight register 402 that stores a weight input. The weight input can be transferred from a top adjacent cell or from a weight fetcher interface, depending on the position of the cell within the systolic array. The cell can also include a sum in register 404. The sum in register 404 can store an accumulated value from the top adjacent cell. Multiplication circuitry 408 can be used to multiply the weight input from the weight register 402 with the activation input from the activation register 406. The multiplication circuitry 408 can output the product to summation circuitry 410.

The summation circuitry can sum the product and the accumulated value from the sum in register 404 to generate a new accumulated value. The summation circuitry 410 can then send the new accumulated value to another sum in register located in a bottom adjacent cell. The new accumulated value can be used as an operand for a summation in the bottom adjacent cell.

The cell can also shift the weight input and the activation input to adjacent cells for processing. For example, the weight register 402 can send the weight input to another weight register in the bottom adjacent cell. The activation register 406 can send the activation input to another activation register in the right adjacent cell. Both the weight input and the activation input can therefore be reused by other cells in the array at a subsequent clock cycle.

In some implementations, the cell also includes a control register. The control register can store a control signal that determines whether the cell should shift either the weight input or the activation input to adjacent cells. In some implementations, shifting the weight input or the activation input takes one or more clock cycles. The control signal can also determine whether the activation input or weight inputs are transferred to the multiplication circuitry 408, or can determine whether the multiplication circuitry 408 operates on the activation and weight inputs. The control signal can also be passed to one or more adjacent cells, e.g., using a wire.

In some implementations, weights are pre-shifted into a weight path register 412. The weight path register 412 can receive the weight input, e.g., from a top adjacent cell, and transfer the weight input to the weight register 402 based on the control signal. The weight register 402 can statically store the weight input such that as activation inputs are transferred to the cell, e.g., through the activation register 406, over multiple clock cycles, the weight input remains within the cell and is not transferred to an adjacent cell. Therefore, the weight input can be applied to multiple activation inputs, e.g., using the multiplication circuitry 408, and respective accumulated values can be transferred to an adjacent cell.

Figure 5:
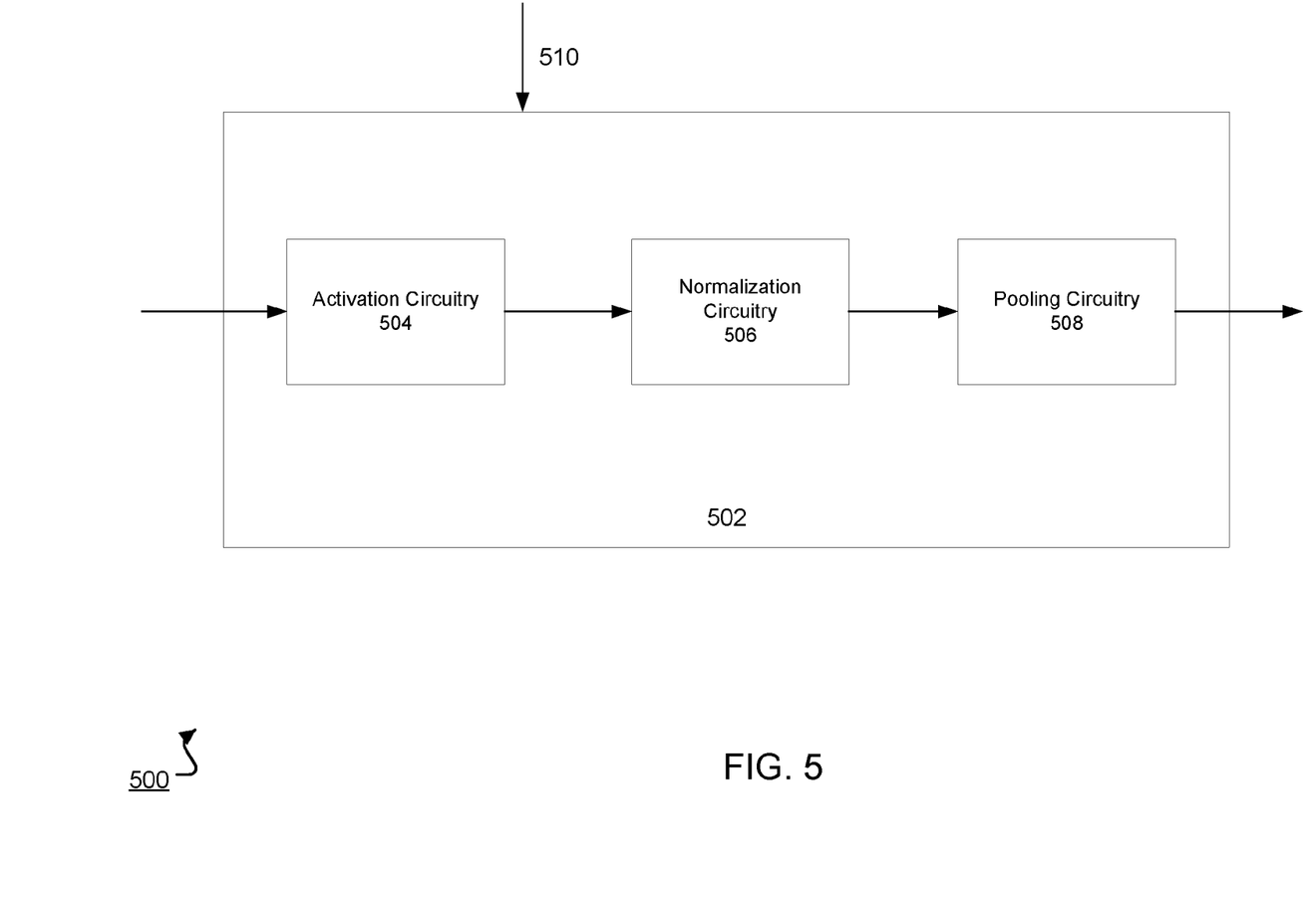
FIG. 5 shows an example architecture of a vector computation unit.

FIG. 5 shows an example architecture 500 of a vector computation unit 502. The vector computation unit 502 can receive a vector of accumulated values from a matrix computation unit, e.g., the matrix computation unit described in reference to FIG. 2.

The vector computation unit 502 can process the vector of accumulated values at the activation unit 404. In some implementations, the activation unit includes circuitry that applies a non-linear function to each accumulated value to generate activation values. For example, the non-linear function can be tan h(x), where x is an accumulated value.

Optionally, the vector computation unit 502 can normalize the activation values in normalization circuitry 506 that generates normalized values from the activation values.

Also optionally, the vector computation unit 502 can pool values, either activation values or normalized values, using pooling circuitry 508. The pooling circuitry 508 can apply an aggregation function to one or more of the normalized values to generate pooled values. In some implementations, the aggregation functions are functions that return a maximum, minimum, or average of the normalized values or of a subset of the normalized values.

Control signals 510 can be transferred, e.g., by the sequencer 206 of FIG. 2, and can regulate how the vector computation unit 502 processes the vector of accumulated values. That is, the control signals 510 can regulate whether the activation values are pooled, normalized, or both. The control signals 510 can also specify the activation, normalization, or pooling functions, as well as other parameters for normalization and pooling, e.g., a stride value.

The vector computation unit 502 can send values, e.g., activation values, normalized values, or pooled values, to a unified buffer, e.g., the unified buffer 208 of FIG. 2.

In some implementations, the pooling unit 508 receives the activation values instead of the normalization circuitry 506 and stores the pooled values in the unified buffer. In some implementations, the pooling unit 508 sends the pooled values to the normalization circuitry 506, which generates normalized values to be stored in the unified buffer.

Figure 6:
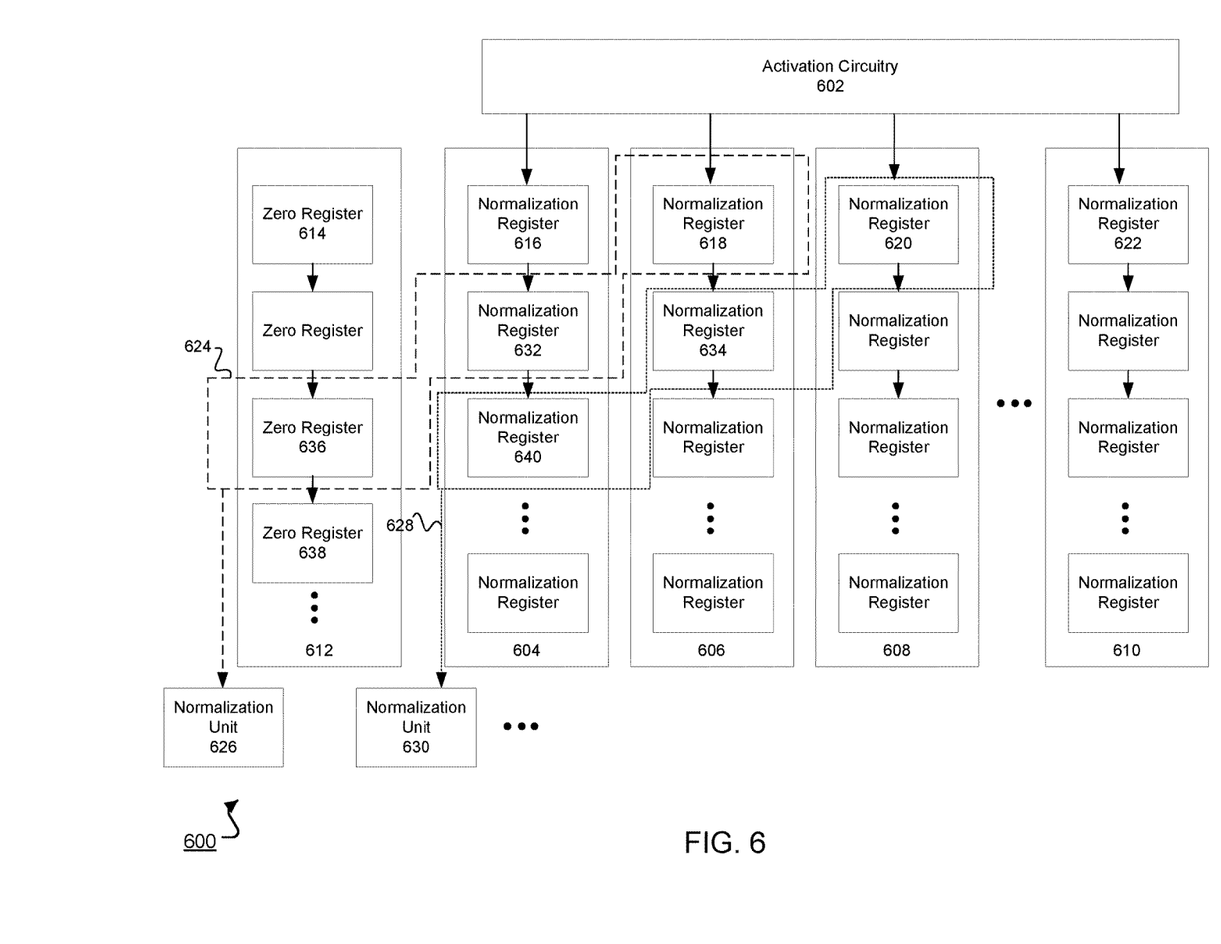
FIG. 6 shows an example architecture for normalization circuitry.

FIG. 6 shows an example architecture 600 for normalization circuitry, e.g., the normalization circuitry 506 of FIG. 5. The normalization circuitry can, for each clock cycle, receive a vector of activated values from activation circuitry 602, e.g., the activation circuitry 504 of FIG. 5. Depending on the value of a system parameter, the normalization circuitry can either pass the vector of activated values to pooling circuitry, i.e., without normalizing the activated values, or generate a vector of normalized values from the vector of activated values. For example, if the system parameter, e.g., provided by a user, instructs the circuit to pass the vector of activated values to pooling circuitry, e.g., the user does not want to normalize the values, the system parameter can be a signal to a multiplexor that passes the values directly to the pooling circuitry and skips the normalization circuitry.

In some implementations, the vector of activated values includes activated values generated by applying an activation function to accumulated values generated from activation inputs based on a set of weights inputs.

In some other implementations, the activated values for the set of weight inputs are staggered across multiple vectors of activated values because of delays caused when shifting activation and weight inputs. For example, a matrix computation unit can generate accumulated values $A_0$-$A_n$ from a set of activation inputs and a set of weight inputs from Kernel A, accumulated values $B_0$-$B_n$ from a set of activation inputs and a set of weight inputs from Kernel B, and accumulated values $C_0$-$C_n$ from a set of activation inputs and a set of weight inputs from Kernel C. The accumulated values $A_0$-$A_n$ and $B_0$-$B_n$ can be generated over subsequent clock cycles because weight inputs and activation inputs are shifted across the matrix computation unit before corresponding accumulated values are computed, as described above in reference to FIG. 4. $A_0$ can be generated on clock cycle 0, $A_1$ and $B_0$ can be generated on clock cycle 1, $A_2$, $B_1$, and $C_0$ can be generated on clock cycle 2, $A_n$, $B_{n-1}$, and $C_{n-2}$ can be generated on clock cycle n, and so forth. The matrix computation unit can generate a vector of accumulated values including $A_0$ and $B_0$ for clock cycle X and another vector of accumulated values including $A_1$ and $B_1$ for clock cycle X+1. Therefore, the accumulated values for a given kernel, e.g., $A_0$-$A_n$ from Kernel A, can be spread out across multiple vectors of accumulated values over subsequent clock cycles in a staggered fashion.

As a result, the multiple vectors of accumulated values can become multiple vectors of activated values, e.g., after processing by the activation circuitry 504 of FIG. 5, and each of the multiple vectors of activated values can be sent to a distinct normalization register column. In particular, the activation circuitry 602 can send each activated value from a vector of activated values to a distinct normalization register column 604-610. In particular, normalization registers 616-622 can each receive a respective activated value. A normalization register column can include a set of normalization registers connected in series. That is, an output of a first normalization register in the column can be sent as an input to a second normalization register in the column. In some implementations, each normalization register stores an activated value. In some other implementations, each normalization register also stores a square of the activated value. In some implementations, the normalization circuitry has as many normalization register columns as there are columns in the activation circuitry or in the systolic array.

In some implementations, before providing the vectors of activated values to the normalization register columns, the circuit sends the vectors to a squaring unit. The squaring unit can calculate a square of each activated value for use in computing normalized values, which will be described further below. The squaring unit can generate vectors of squared activated values, i.e., one for each vector of activated values, and send the vectors of squared activated values to the normalization register columns. In some other implementations, the squaring unit sends both the vectors of activated values and the vectors of squared activated values to the normalization register columns.

In some implementations, the normalization circuitry forms staggered groups, e.g., staggered groups 624 and 628, based on a normalization radius parameter. The normalization radius parameter can indicate a number of outputs from surrounding normalization registers to use when calculating a normalized value. The number of outputs can be equal to two times the normalization radius parameter. By way of illustration, staggered groups 624 and 628 are formed from a normalization radius parameter of 1. The staggered group 624 includes normalization units 632 and 618, and also includes zero register 636. Zero register 636 can always output a value of 0 and can serve as a buffer when calculating normalized values on edges of the normalization circuitry. The zero registers 635 and 638 can be included in a column of zero registers 612. An example of values inside the staggered groups will be described further below in reference to FIG. 7.

In some implementations, normalization units, e.g., normalization units 626, 630, use outputs from the staggered groups to generate a corresponding component, e.g., a square of activation values inside registers of the staggered group, used to compute a normalized value. For example, the components can be used to generate a sum of squares of all activated values. Normalization units can use the sum of squares to compute the normalized value, which will be described further below. In some implementations, there is a corresponding normalization unit for each staggered group.

The normalization circuitry can generate a normalized value for an activated value based on the staggered groups. For example, the normalized value for an activation value stored in normalization register 632 can be stored in normalization unit 626. In particular, based on the staggered group 624, the normalization circuitry can compute a sum, e.g., using summation circuitry, of all of the squares generated by normalization registers inside the staggered group 624. The sum can be stored in the normalization unit 626. The sum can be a normalized value corresponding to an activated value. The normalization circuitry can continue to generate another corresponding normalized value for staggered group 628, which includes normalization registers 634, 640, and zero register 620, and the corresponding normalized value can be stored in normalization unit 630.

The normalization circuitry can form a vector of normalized values from the generated normalized values, e.g., which can be stored in the normalization units, and can send the vector of normalized values to pooling circuitry, if determined by a neural network parameter, or a unified buffer.

Figure 7:
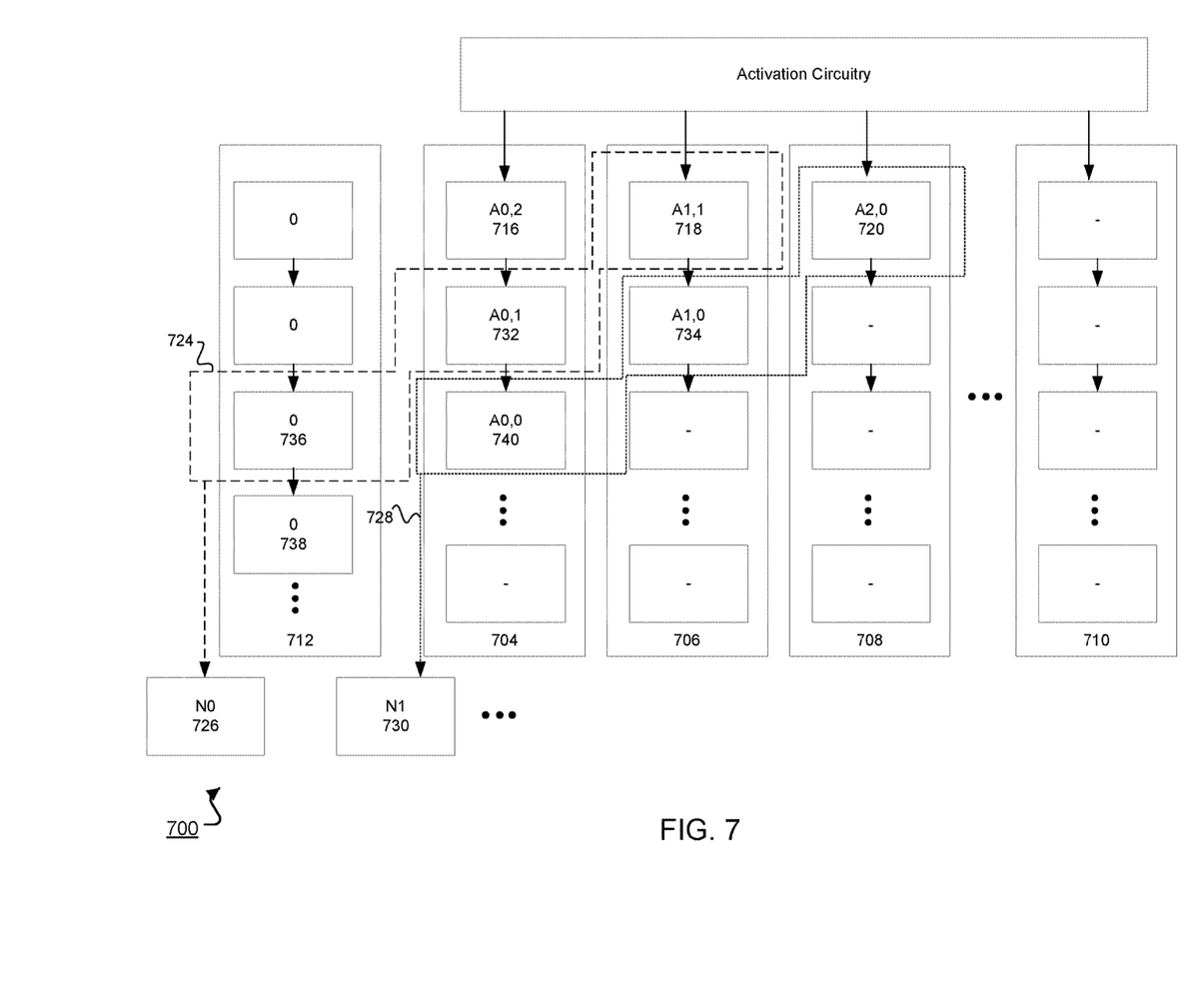
FIG. 7 shows another example architecture for normalization circuitry with sample activation values.

FIG. 7 shows another example architecture 700 for normalization circuitry with sample activated values inside normalization registers. The normalization radius parameter can be 1, as demonstrated in the staggered groups 724 and 728. In particular, staggered group 724 includes normalization registers 732 and 718 and zero register 736. Staggered group 728 includes zero register 738 and normalization registers 734 and 740.

The normalization registers 716-720, 732, 734, and 740 can store activated values, e.g., corresponding to columns from a systolic array. The notation AX,Y, e.g., A0,0 of normalization register 740, denotes an activated value corresponding to Column X in Clock Cycle Y.

As demonstrated in the figure, activated values are loaded in a staggered manner. For example, on Clock Cycle 0, activated values A0,0, A1,0, and A2,0 can be computed, but the normalization circuitry loads the three activated values over three clock cycles. In some implementations, the activated values are loaded in a non-staggered manner. That is, A0, 0, A1,0, and A2,0 can be loaded in one clock cycle.

N0 can be a normalized value for A0,1 stored in normalization register 726. N0 can be calculated based on the sum of squares of A0,1 and A1,1 and 0 (from zero register 736), which will be described below in reference to FIG. 8. Similarly, N1 can be a normalized value for A0,0 that is calculated based on the sum of squares of A0,0 and A1,0 and A2,0 (from register 720).

The normalization circuitry can compute normalized values for each activated value using a radius of 1. Other radii are possible. If the normalization circuitry has not yet loaded the activated values necessary for a normalization calculation, the normalization circuitry can shift the activated value to a subsequent normalization register until the necessary activated values are loaded. For example, to calculate a normalized value for activated value A0,2 stored in normalization register 716 requires an activated value A1,2 in light of a radius of 1. Activated value A1,2 can be loaded into normalization register 718 on a subsequent clock cycle, at which point, the normalization circuitry can compute a normalized value for activated value A0,2.

Figure 8:
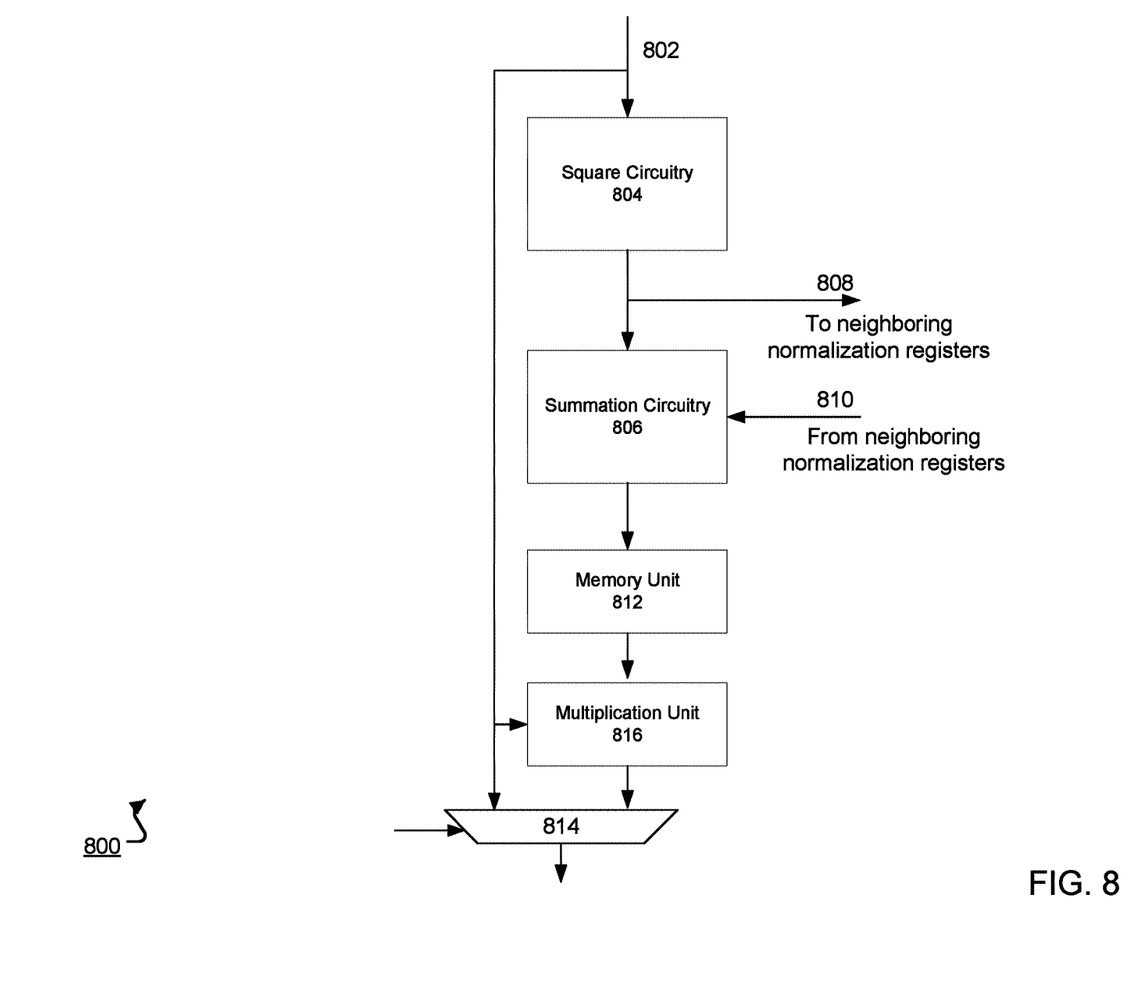
FIG. 8 shows an example architecture for a normalization unit inside the normalization circuitry.

FIG. 8 shows an example architecture 800 for a normalization unit inside the normalization circuitry. The normalization unit can receive an activated value 802. In some implementations, the activated value 802 is passed to a subsequent normalization unit through a multiplexor 814, e.g., when the circuit determines the activated value 802 is in an incorrect position, i.e., the activated value needs to be stored at a subsequent normalization unit for a normalization calculation. The normalization circuitry can send a control signal to the multiplexor 814 to pass through a particular output, e.g., either a normalized value or an unaffected activation value.

In some implementations, the activated value is passed to square circuitry 804. The square circuitry 804 can generate a squared activated value 808, i.e., raise the activated value to the power of two. The square circuitry 804 can send the squared activated value 808 to neighboring normalization units, e.g., other normalization units in the same staggered group of the normalization unit.

In some implementations, the received activated value is already squared before being provided to the normalization register columns, as described above with reference to FIG. 6.

The normalization unit can also receive squared activated values 810 from the neighboring normalization units at summation circuitry 806. The summation circuitry 806 can generate a sum of the squared activated value 808 and the received squared activated values 810.

The sum can be sent to a memory unit 812. In some implementations, the memory unit 812 includes a look up table and interpolation unit. The normalization unit can use a portion of the sum, e.g., a set of high bits of the sum, as an address to look up one or more coefficients provided by a system parameter. The memory and interpolation unit 812 can generate a normalization scaling factor based on the coefficients and the sum of squared activated values. The normalization scaling factor can be sent to multiplication unit 816.

In some implementations, the sum of squares is a 12 bit value. The normalization unit can use the top 4 bits of the sum of squares as an index to the lookup table. The top 4 bits can be used to access coefficients, e.g. which are specified by a user, from the lookup table. In some implementations, the top 4 bits access 2 12-bit coefficients: A & B. The bottom eight bits can be a delta used in an equation to calculate the normalization scaling factor. An example equation is given by Scaling factor=minimum (1048575, [A*delta+B*256+

2^7])>>8, where minimum processes two arguments and returns the argument with the minimum value.

The normalization unit can multiply, using the multiplication unit 816, the normalization scaling factor with the activated value 802 to generate a normalized value. In some implementations, the normalized value is then sent to pooling circuitry, e.g., the pooling circuitry 508 of FIG. 5.

Figure 9:
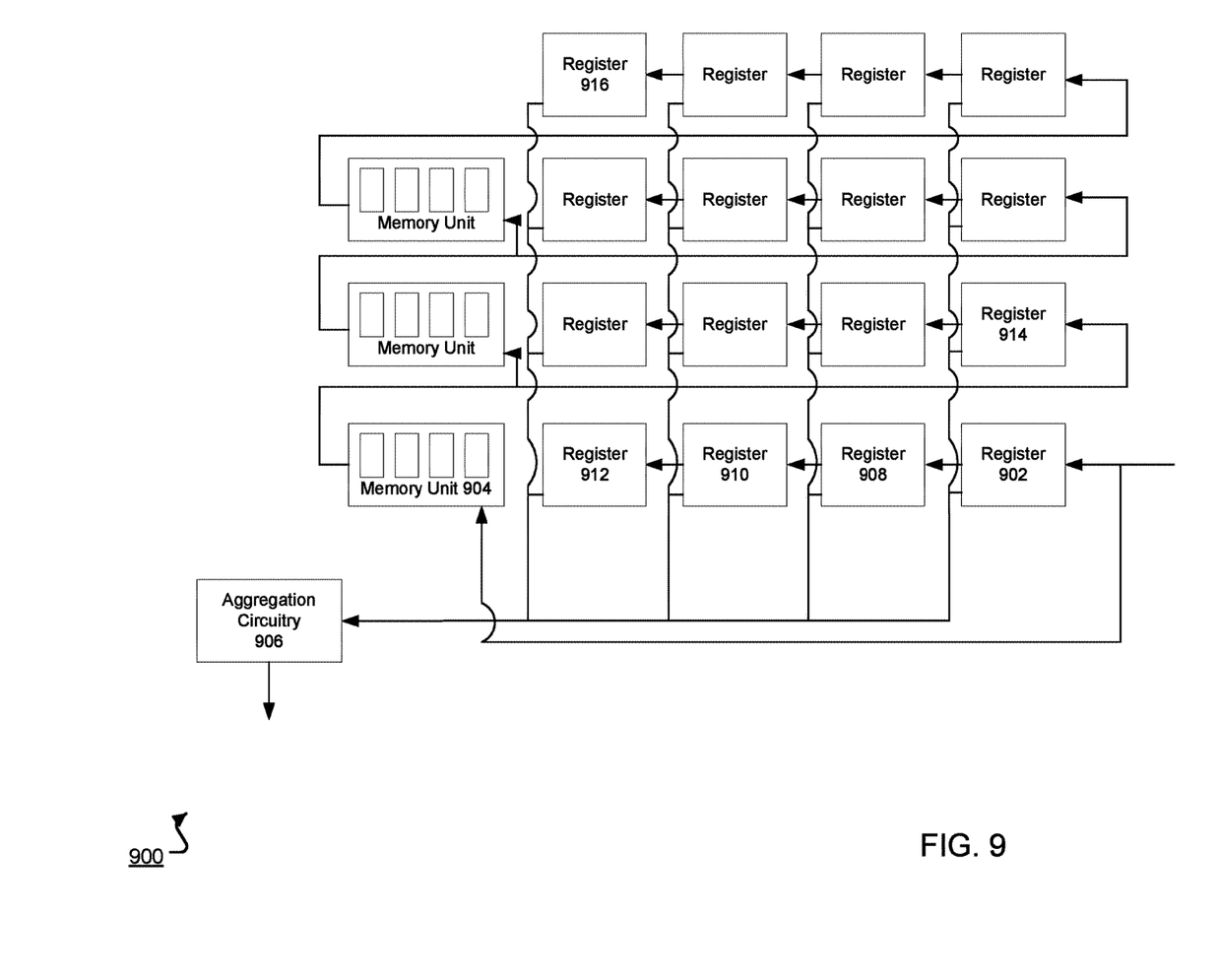
FIG. 9 shows an example architecture for pooling circuitry.

FIG. 9 shows an example architecture 900 for pooling circuitry. The pooling circuitry can apply an aggregation function to one or more normalized or activated values to generate pooled values. By way of illustration, the architecture 900 can perform a pooling of a 4×4 set of activated or normalized values. Although the pooling shown in FIG. 9 has a square region, i.e., 4×4, rectangular regions are possible. For example, if the region has a window of n×m, the architecture 900 can have n*m registers, i.e., n columns and m rows.

The pooling circuitry can receive a sequence of elements from the vector of normalized values, e.g., from normalization circuitry 506 of FIG. 5. For example, the sequence can represent pixels of an 8×8 portion of an image, and the pooling circuitry architecture 900 can pool values from a 4×4 subset of the 8×8 portion. In some implementations, normalized values are appended to the sequence once computed by normalization circuitry coupled to the pooling circuitry. In some implementations, the neural network processor includes multiple parallel pooling circuitries. Over each clock cycle, each pooling circuitry can receive a respective element from the vector of normalized values from normalization circuitry. Each pooling circuitry can interpret elements received from the normalization circuitry as a two-dimensional image arriving in raster order.

The pooling circuitry can include a series of registers and memory units. Each register can send an output to aggregation circuitry 906 that applies an aggregation function across the values stored inside the registers. The aggregation function can return a minimum, maximum, or average value from a set of values.

A first normalized value can be sent to and stored inside register 902. On a subsequent clock cycle, the first normalized value can shift to a subsequent register 908 and be stored in memory 904, and a second normalized value can be sent to and stored inside register 902.

After four clock cycles, four normalized values are stored inside the first four registers 902, 908-912. In some implementations, the memory unit 904 operates under first-in-first-out (FIFO). Each memory unit can store up to eight normalized values. After the memory unit 904 contains a complete row of pixels, the memory unit 904 can send a normalized value to register 914.

At any given point in time, the aggregation circuitry 906 can access normalized values from each register. The normalized values in the registers should represent normalized values for a 4×4 portion of the image.

The pooling circuitry can generate a pooled value from the accessed normalized values by using the aggregation circuitry 906, e.g., a maximum, a minimum, or an average normalized value. The pooled value can be sent to a unified buffer, e.g., the unified buffer 208 of FIG. 2.

After generating the first pooled value, the pooling circuitry can continue to generate pooled values by shifting the normalized values through each register so that new normalized values are stored in the registers and can be pooled by the aggregation circuitry 906. For example, in architecture 900, the pooling circuitry can shift the normalized values over 4 more clock cycles, thereby shifting the normalized values in the memory units into the registers. In some implementations, the pooling circuitry shifts the new normalized values until a new normalized value is stored in a last topmost register, e.g., register 916.

The aggregation circuitry 906 can then pool the new normalized values stored in the registers.

In some implementations, instead of receiving a vector of normalized values, the pooling circuitry receives a vector of activated values, as described above in reference to FIG. 5.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A circuit for performing neural network computations for a neural network comprising a plurality of layers, the circuit comprising:

a vector computation unit, wherein the vector computation unit includes:

activation circuitry configured to receive a vector of accumulated values, where the accumulated values correspond to products of a matrix multiplication between an input to a layer of the neural network and a parameter matrix for the layer, and where the activation circuitry is configured to apply a function to each accumulated value to generate a vector of activation values; and normalization circuitry coupled to the activation circuitry and configured to receive activation values of the vector of activation values and to generate a respective normalized value for each activation value, the normalization circuitry comprising a plurality of normalization register columns, each normalization register column comprising a plurality of normalization registers, and wherein at least one normalization register in each normalization register column is configured to receive a respective activation value for generating at least the respective normalized value for the activation value.

2. The circuit of claim 1, where the activation circuitry receives the vector of accumulated values from a systolic array in the circuit.

3. The circuit of claim 1, where the plurality of normalization registers in each normalization register column are connected in series, each normalization register column is configured to receive the respective activation value, where the normalization circuitry is configured to form groups around one or more normalization registers, each group corresponding to a normalization unit, and each normalization unit is configured to calculate a respective normalized value for the respective activation value.

4. The circuit of claim 3, where each normalization register is configured to pass a distinct activation value to an adjacent normalization register column.

5. The circuit of claim 3, where each group is formed using a normalization radius parameter.

6. The circuit of claim 3, where each normalization unit is configured to:
receive the respective activation value;
generate a respective intermediate normalized value from the respective activation value; and
send the respective intermediate normalized value to one or more neighboring normalization units.

7. The circuit of claim 6, where generating the respective intermediate normalized value comprises generating a square of the respective activation value.

8. The circuit of claim 6, where each normalization unit is further configured to:
receive, from one or more neighboring normalization units, one or more intermediate normalized values generated from activation values;
sum each intermediate normalized value to generate an index;
use the index to access one or more values from a lookup table;
generate a scaling factor from the one or more values and the index; and
generate the respective normalized value from the scaling factor and the respective activation value.

9. The circuit of claim 1, further comprising pooling circuitry configured to receive the normalized values and configured to pool the normalized values to generate a pooled value.

10. The circuit of claim 6, where the pooling circuitry is configured to store the plurality of normalized values in a plurality of registers and a plurality of memory units,
where the plurality of registers and the plurality of memory units are connected in series, where each register stores one normalized value and each memory unit stores a plurality of normalized values,
where the pooling circuitry is configured to, after every clock cycle, shift a given normalized value to a subsequent register or memory unit, and
where the pooling circuitry is configured to generate the pooled value from the normalized values.

11. The circuit of claim 1, further comprising pooling circuitry configured to receive the activation values and configured to pool the activation values to generate a pooled value.

12. The circuit of claim 11, where the pooling circuitry is configured to store the plurality of activation values in a plurality of registers and a plurality of memory units,
where the plurality of registers and the plurality of memory units are connected in series, where each register stores one normalized value and each memory unit stores a plurality of activation values,
where the pooling circuitry is configured to, after every clock cycle, shift a given activation value to a subsequent register or memory unit, and
where the pooling circuitry is configured to generate the pooled value from the activation values.

13. A method for performing neural network computations for a neural network comprising a plurality of layers, the method comprising:
receiving, at an activation circuit in a vector computation unit and from a systolic array, a vector of accumulated values, where the accumulated values correspond to products of a matrix multiplication between an input to a layer of the neural network and a parameter matrix for the layer;
applying, at the activation circuit in the vector computation unit, a function to each accumulated value to generate a vector of activation values;
receiving, at a normalization circuit in the vector computation unit, the vector of activation values from the activation circuit, wherein the normalization circuit is coupled to the activation circuit in the vector computation unit, and wherein the normalization circuit comprises multiple normalization register columns, each normalization register column comprising multiple normalization registers, and wherein at least one normalization register in each normalization register column is configured to receive a respective activation value of the vector of activation values; and
generating, at the normalization circuit in the vector computation unit, a respective normalized value for each activation value received by the at least one normalization register in a normalization register column.

14. The method of claim 13, where receiving the vector of activation values at the normalization circuit, comprises:
receiving, at the normalization circuit, the respective activation value for each normalization register column in the normalization circuit, wherein each normalization register column comprises multiple normalization registers that are connected in series.

15. The method of claim 14, further comprising:
forming, at the normalization circuit, groups around one or more normalization registers, where each group corresponds to a normalization unit; and
calculating, at each normalization unit, a respective normalized value for the respective activation value.

16. The method of claim 14, further comprising:
passing, using a normalization register of the normalization circuit, a distinct activation value to an adjacent normalization register column; and
using, at the normalization circuit, a normalization radius parameter to form the groups around the one or more normalization registers.

* * * * *